United States Patent
Hagihara

(10) Patent No.: US 9,871,689 B2
(45) Date of Patent: Jan. 16, 2018

(54) TERMINAL CONTROL SYSTEM WITH OPTIMIZED STARTUP TIMING OF EACH TERMINAL DEVICE BASED ON COMMUNICATION TIMES OF OTHER TERMINAL DEVICES

(71) Applicant: TLV CO., LTD., Kakogawa-shi, Hyogo (JP)

(72) Inventor: Kazunari Hagihara, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 32 days.

(21) Appl. No.: 14/781,518

(22) PCT Filed: Apr. 22, 2014

(86) PCT No.: PCT/JP2014/061212
§ 371 (c)(1),
(2) Date: Sep. 30, 2015

(87) PCT Pub. No.: WO2014/175233
PCT Pub. Date: Oct. 30, 2014

(65) Prior Publication Data
US 2016/0043891 A1  Feb. 11, 2016

(30) Foreign Application Priority Data

Apr. 22, 2013 (JP) .................. 2013-089081

(51) Int. Cl.
*H04L 29/08* (2006.01)
*H04L 29/02* (2006.01)
(Continued)

(52) U.S. Cl.
CPC ........ *H04L 29/08612* (2013.01); *H04L 29/02* (2013.01); *H04Q 9/00* (2013.01);
(Continued)

(58) Field of Classification Search
CPC ......... H04W 52/0216; H04W 52/0219; H04W 52/02; H04W 72/048; H04W 28/0215;
(Continued)

(56) References Cited

U.S. PATENT DOCUMENTS 7,301,477 B2 * 11/2007 Isoyama .................. H04Q 9/00
                                                340/539.19
9,320,002 B2 *  4/2016 Lee .................... H04W 56/0015
(Continued)

FOREIGN PATENT DOCUMENTS

JP   2005-135289   5/2005
JP   2006-217373   8/2006
(Continued)

OTHER PUBLICATIONS

International Search Report, dated Jun. 17, 2014, issued in corresponding International Application No. PCT/JP2014/061212.

Primary Examiner — Hoang-Chuong Vu
(74) Attorney, Agent, or Firm — The Webb Law Firm

(57) ABSTRACT

Each of terminal devices 3 belongs to one of groups, starts up at a startup time, and performs terminal processing within a communication time after an offset time is lapsed. A control device 2 uses a sum of the communication times of the terminal devices 3 belonging to the same group as the communication time of the group. The offset time is calculated for terminal devices 3 belonging to another group which performs the terminal processing subsequently to the terminal devices 3 belonging to the previous group, based on the communication time of the previous group. A next startup time for each terminal device 3 is determined based on the communication time and the offset time, and it is set to the terminal device 3.

5 Claims, 18 Drawing Sheets

1: EXAMPLE OF ENTIRE CONFIGURATION OF TERMINAL CONTROL SYSTEM

(51) Int. Cl.
  *H04Q 9/00* (2006.01)
  *H04W 52/02* (2009.01)
  *H04W 72/04* (2009.01)

(52) U.S. Cl.
  CPC ......... *H04W 52/02* (2013.01); *H04W 72/048* (2013.01); *H04Q 2209/40* (2013.01); *H04Q 2209/845* (2013.01); *H04Q 2209/883* (2013.01); *Y02B 60/50* (2013.01)

(58) Field of Classification Search
  CPC ............. H04W 4/005; H04L 29/08612; H04Q 2209/756; H04Q 2209/00; H04Q 2209/10; H04Q 2209/40; H04Q 9/00; H04Q 2209/70; H04Q 2209/75; H04Q 2209/845; H04Q 2209/883
  See application file for complete search history.

(56) References Cited

U.S. PATENT DOCUMENTS

| | | | |
|---|---|---|---|
| 2003/0148800 A1* | 8/2003 | Lee | H04B 1/1615 455/574 |
| 2005/0064818 A1* | 3/2005 | Assarsson | H04W 74/006 455/41.2 |
| 2005/0122233 A1* | 6/2005 | Isoyama | H04Q 9/00 340/870.11 |
| 2005/0180466 A1* | 8/2005 | Franchuk | H04J 3/0638 370/503 |
| 2008/0008510 A1* | 1/2008 | Lee | H04J 3/06 399/411 |
| 2010/0002594 A1 | 1/2010 | Elend | |
| 2010/0142412 A1 | 6/2010 | Synnergren et al. | |
| 2011/0128855 A1 | 6/2011 | Ando et al. | |
| 2012/0058775 A1* | 3/2012 | Dupray | G01S 5/0257 455/456.1 |
| 2013/0044661 A1* | 2/2013 | Jokimies | H04W 52/0274 370/311 |
| 2013/0252643 A1* | 9/2013 | Park | H04W 8/24 455/458 |

FOREIGN PATENT DOCUMENTS

| | | |
|---|---|---|
| JP | 2011-066911 | 3/2011 |
| JP | 2011-124949 | 6/2011 |
| WO | 2012/124128 | 9/2012 |

* cited by examiner

EXAMPLE OF OFFSET TIME MANAGEMENT DATA 443

|  | GROUP 1 | GROUP 2 | GROUP 3 |
| --- | --- | --- | --- |
| OFFSET TIME | 5 SECONDS | 14 SECONDS | 17 SECONDS |

FIG. 6

EXAMPLE OF MEASURING PERIOD DATA AND OFFSET TIME DATA
RECORDED IN TERMINAL DEVICE BELONGING TO GROUP 1

562a            563a

| MEASURING PERIOD DATA | OFFSET TIME DATA |
|---|---|
| 60 MINUTES | 5 SECONDS |

FIG. 8A

EXAMPLE OF MEASURING PERIOD DATA AND OFFSET TIME DATA
RECORDED IN TERMINAL DEVICE BELONGING TO GROUP 2

562b            563b

| MEASURING PERIOD DATA | OFFSET TIME DATA |
|---|---|
| 60 MINUTES | 14 SECONDS |

FIG. 8B

EXAMPLE OF MEASURING PERIOD DATA AND OFFSET TIME DATA
RECORDED IN TERMINAL DEVICE BELONGING TO GROUP 3

562c            563c

| MEASURING PERIOD DATA | OFFSET TIME DATA |
|---|---|
| 60 MINUTES | 17 SECONDS |

FIG. 8C

EXAMPLE OF OFFSET TIME MANAGEMENT DATA 443

|  | GROUP 1 | | | GROUP 2 | | | GROUP 3 | | |
|---|---|---|---|---|---|---|---|---|---|
| MEASURING PERIOD | 30 MIN | 1 HR | 3 HR | 30 MIN | 1 HR | 3 HR | 30 MIN | 1 HR | 3 HR |
| OFFSET TIME | 2 SEC | 2 SEC | 2 SEC | 6 SEC | 5.5 SEC | 3.5 SEC | 7.5 SEC | 7 SEC | 3.5 SEC |

FIG. 15

EXAMPLE OF MEASURING PERIOD DATA AND OFFSET TIME DATA
RECORDED IN TERMINAL DEVICE BELONGING TO GROUP 1

562d          563d

| MEASURING PERIOD DATA | OFFSET TIME DATA |
|---|---|
| 30 MINUTES | 2 SECONDS |
| 1 HOUR | 2 SECONDS |
| 3 HOURS | 2 SECONDS |

FIG. 16A

EXAMPLE OF MEASURING PERIOD DATA AND OFFSET TIME DATA
RECORDED IN TERMINAL DEVICE BELONGING TO GROUP 2

562e          563e

| MEASURING PERIOD DATA | OFFSET TIME DATA |
|---|---|
| 30 MINUTES | 6 SECONDS |
| 1 HOUR | 5.5 SECONDS |
| 3 HOURS | 3.5 SECONDS |

FIG. 16B

EXAMPLE OF MEASURING PERIOD DATA AND OFFSET TIME DATA
RECORDED IN TERMINAL DEVICE BELONGING TO GROUP 3

562f          563f

| MEASURING PERIOD DATA | OFFSET TIME DATA |
|---|---|
| 30 MINUTES | 7.5 SECONDS |
| 1 HOUR | 7 SECONDS |
| 3 HOURS | 3.5 SECONDS |

FIG. 16C

TERMINAL CONTROL SYSTEM WITH OPTIMIZED STARTUP TIMING OF EACH TERMINAL DEVICE BASED ON COMMUNICATION TIMES OF OTHER TERMINAL DEVICES

TECHNICAL FIELD

The present invention relates to a terminal control system etc., which controls terminals.

BACKGROUND ART

Some conventional measurement systems set a startup time according to a measurement schedule to each terminal, and transmit measurement data from a plurality of terminals to a host terminal at every predetermined period (for example, refer to Patent Document 1).

Some conventional wireless terminal devices cancel a sleep state and receive a beacon addressed to a group to which a wireless terminal belongs when it reaches a startup timing of the group concerned (for example, refer to Patent Document 2).

REFERENCE DOCUMENTS OF CONVENTIONAL ART

Patent Documents

Patent Document 1: JP2011-124949A
Patent Document 2: JP2011-066911A

DISCLOSURE OF THE INVENTION

Problems to be Solved by the Invention

However, in the conventional measurement systems or wireless terminal devices, the startup timing of each terminal is not set in consideration of communication times of other terminals. Therefore, it is difficult to say that the startup timings of all the terminals are fully optimized.

Particularly, for the conventional measurement systems or wireless terminal devices, it is necessary to efficiently startup the wireless communication terminal driven by a battery in order to save power. In this regard, there is room to achieve the power savings of the terminals entirely in the conventional measurement system or wireless terminal devices.

Therefore, the problem to be solved by the present invention is to optimize a startup timing of each terminal in consideration of communication times of other terminals to achieve power savings of the terminals.

SUMMARY OF THE INVENTION

In order to solve the problem, a terminal control system according to the present invention includes a plurality of terminal devices and a control device for controlling the plurality of terminal devices.

The terminal device is configured to:
start up at a predetermined startup time, after a reference time that is a reference when the plurality of terminal devices perform predetermined terminal processings during the same period,
complete a preparation for transmission of data as the terminal processing, after the startup time and before a predetermined offset time from the reference time is lapsed, and
perform processing for transmitting predetermined data to the control device, after the offset time is lapsed and within a predetermined communication time.

The control device is configured to:
calculate an offset time for another terminal device for performing the terminal processing subsequently to the terminal device, based on the communication time.

The another terminal device is configured to:
set a startup time determined based on the calculated offset time as a next startup time.

Effects of the Invention

According to the present disclosure, a startup timing of each terminal device can be optimized in consideration of communication times of other terminal devices, thereby achieving power saving of the terminal devices.

BRIEF DESCRIPTION OF THE DRAWINGS

FIG. 6 is a view illustrating one example of an offset time management data 443.

FIG. 8A is a view illustrating examples of measuring period data and offset time data recorded on an EEPROM 56 of the terminal device 3 belonging to Group 1.

FIG. 8B is a view illustrating examples of the measuring period data and the offset time data recorded on the EEPROM 56 of the terminal device 3 belonging to Group 2.

FIG. 8C is a view illustrating examples of the measuring period data and the offset time data recorded on the EEPROM 56 of the terminal device 3 belonging to Group 3.

FIG. 15 is a view illustrating one example of the offset time management data 443.

FIG. 16A is a view illustrating examples of the measuring period data and the offset time data recorded on the EEPROM 56 of the terminal device 3 belonging to Group 1.

FIG. 16B is a view illustrating examples of the measuring period data and the offset time data recorded on the EEPROM 56 of the terminal device 3 belonging to Group 2.

FIG. 16C is a view illustrating examples of the measuring period data and the offset time data recorded on the EEPROM 56 of the terminal device 3 belonging to Group 3.

MODES FOR CARRYING OUT THE INVENTION

Hereinafter, one desirable embodiment of terminal devices and a terminal controlling device which constitute a terminal control system according to the present invention will be described with reference to the accompanying drawings. Note that in the following description, a case where the present invention is applied to the terminal devices which measure an operating state of a steam trap, respectively, and to a terminal controlling device which controls the terminal devices will be illustrated. Dimensions of constituent members in each drawing are not intended to faithfully represent dimensions of actual constituent members, scales of each constituent members, etc.

1. First Embodiment

[1-1. Entire Configuration of Terminal Control System]

Figure 1:
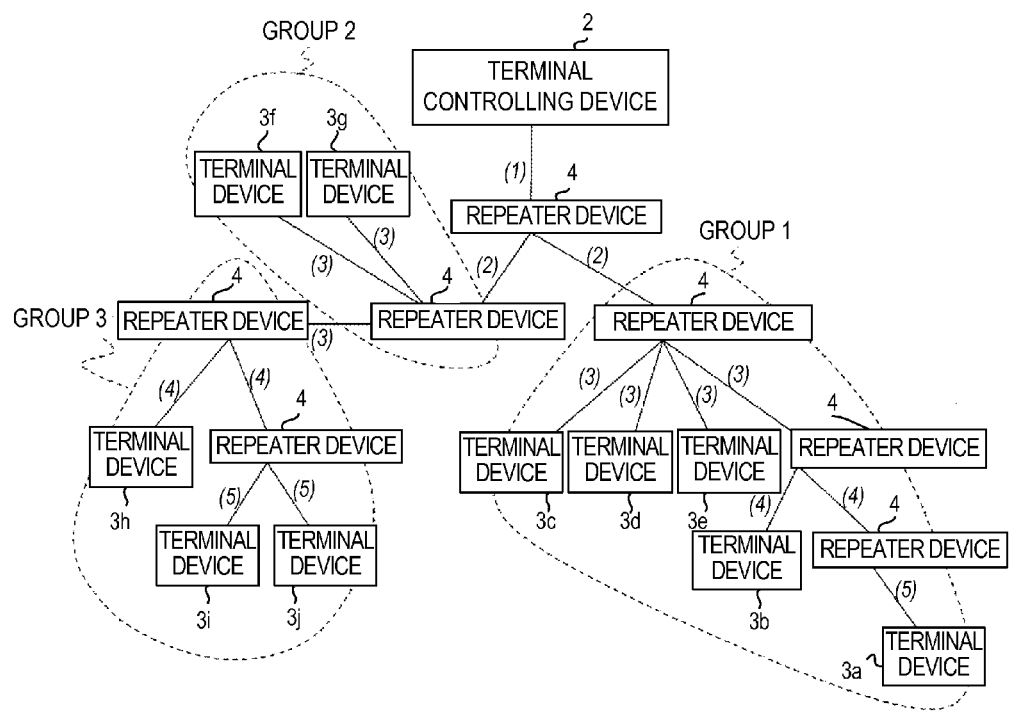
FIG. 1 is a view illustrating one example of the entire configuration of a terminal control system 1.

FIG. 1 is a view illustrating one example of the entire configuration of a terminal control system 1 according to a first embodiment of the present invention. The terminal control system 1 includes one terminal controlling device 2, a plurality of terminal devices 3, and a plurality of repeater devices 4, for example. For example, the terminal controlling device 2 and the repeater devices 4 all have a wireless communication function, and can wirelessly communicate to each other. For example, the terminal devices 3 and the repeater devices 4 all have a wireless communication function, and can wirelessly communicate to each other. Note that, in FIG. 1, for the sake of explanation, although the terminal controlling device 2, the terminal devices 3, and the repeater devices 4 are connected using solid lines, no connection line is necessary if the wireless communication functions are provided.

For example, the terminal device 3 is started up at a predetermined startup time, measures an operating state of a steam trap installed in a steam piping installation, and transmits measurement data to the terminal controlling device 2. Note that the startup of the terminal device 3 may be referred to as "wake-up."

One or more terminal devices 3 forms one group. For example, as illustrated in FIG. 1, Group 1 consists of four terminal devices 3, Group 2 consists of two terminal devices 3, and Group 3 consists of three terminal devices 3.

The terminal controlling device 2 determines, for example, a startup schedule of each terminal device 3, sets data required therefor to each terminal device 3. The terminal controlling device 2 receives, for example, the measurement data from the terminal devices 3.

The repeater device 4 operates as a repeater which relays the communication data, for example, between the terminal controlling device 2 and the terminal device 3.

[1-2. Functional Block Diagram of Terminal Control System]

Figure 2:
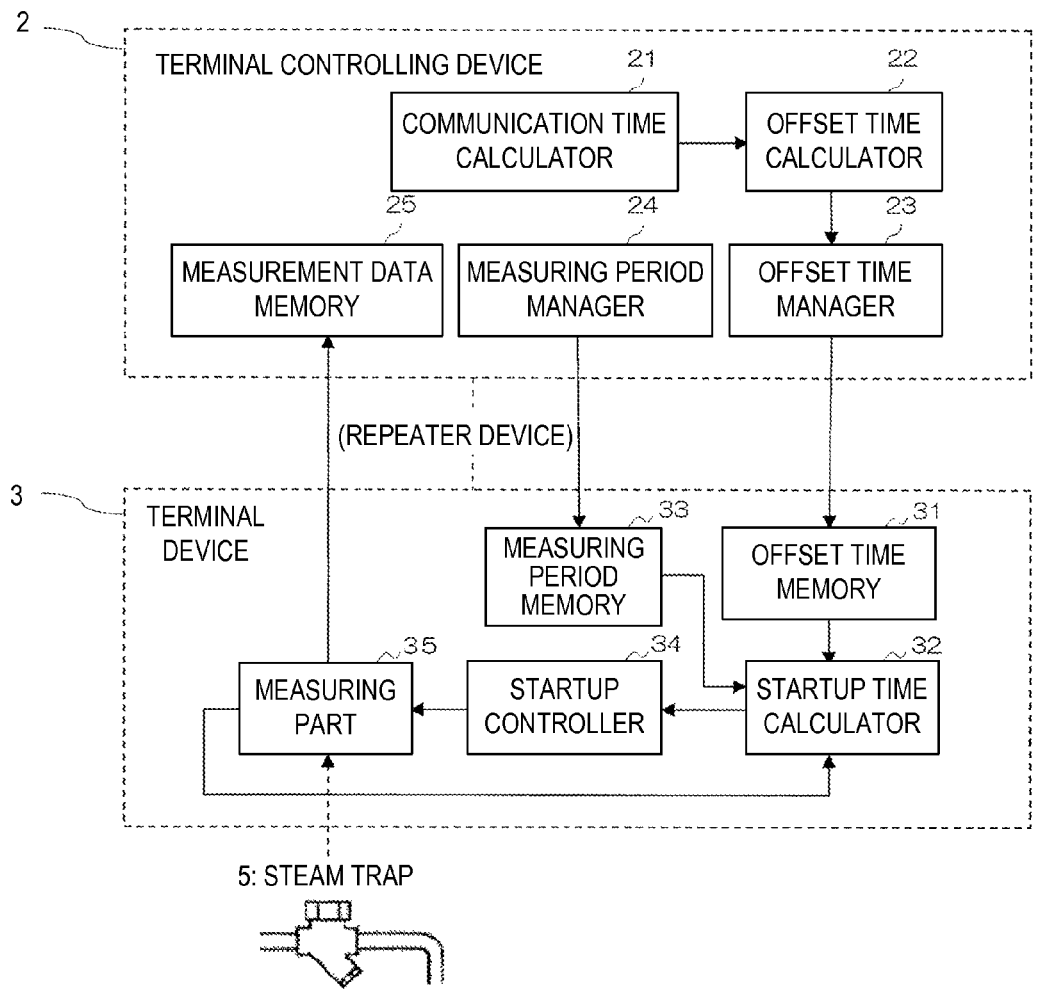
FIG. 2 is a view illustrating one example of a functional block diagram of the terminal control system 1.

FIG. 2 is a view illustrating one example of a functional block diagram of the terminal control system 1.

[1-2-1. Functional Block Diagram of Terminal Controlling Device 2]

The terminal controlling device 2 includes a communication time calculator 21 for calculating communication times, an offset time calculator 22 for calculating offset times, an offset time manager 23 for managing the calculated offset times, a measuring period manager 24 for managing measuring periods, and a measurement data memory 25 for recording the received measurement data.

The communication time calculator 21 can calculate the communication times, for example, when the terminal controlling device 2, the terminal devices 3, and the repeater devices 4 communicate, based on the number of hops between the respective devices, etc.

For example, when two terminal devices 3 successively perform terminal processings, the offset time calculator 22 can calculate an offset time of the latter terminal device 3 so that a communication time of the former terminal device 3 becomes the same as the offset time of the latter terminal device 3.

Here, the offset time is referred to as a period of time during which, if a plurality of terminal devices 3 which perform terminal processing exist within the same period, one terminal device 3 to perform a transmission waits for a processing time or other time of another terminal device 3 which is first performing the transmission.

Therefore, if the latter terminal device 3 has completed a preparation for transmission of the measurement data by the time the offset time is lapsed, the latter terminal device 3 can start the transmission of the measurement data at the same time the communication time of the former terminal device 3 is finished. Thus, an overlap between the communication time of the former terminal device 3 and the communication time of the latter terminal device 3 can be avoided, thereby effectively using power of each terminal device 3.

The offset time manager 23 can manage, for example, the offset time calculated as described above so as to be associated with a group to which each terminal device 3 belongs. Note that the data indicative of the offset time managed by the offset time manager 23 is wirelessly transmitted to each corresponding terminal device 3.

The measuring period manager 24 can manage, for example, the measuring period set for every terminal device 3 so as to be associated with each terminal device 3. Note that the data indicative of the measuring period managed by the measuring period manager 24 is wirelessly transmitted to each corresponding terminal device 3.

The measurement data memory 25 can store, for example, the measurement data received from the terminal device 3 so as to be associated with each terminal device 3.

[1-2-2. Functional Block Diagram of Terminal Device 3]

The terminal device 3 includes an offset time memory 31 for recording the offset time, a startup time calculator 32 for calculating a next startup time, a measuring period memory 33 for recording the measuring period, a startup controller 34 for controlling to start up at the startup time, and a measuring part 35 for measuring the operating state of the steam trap 5.

The offset time memory 31 can record, for example, the offset time calculated by the terminal controlling device 2.

The startup time calculator 32 can calculate a reference time based on the current time and the measuring period, and can calculate a time which is obtained as the next startup time of the terminal device 3 by adding the offset time to the reference time and then subtracting the communication time of the measurement data, for example. The calculated next startup time is set to the startup controller 34.

The measuring period memory 33 can record the measuring period for the terminal device 3 which is, for example, managed by the terminal controlling device 2.

The startup controller 34 can control the terminal device 3 to start up at the next startup time calculated by the startup time calculator 32 described above.

The measuring part 35 can measure, for example, surface temperature and/or ultrasonic vibration of the steam trap 5. Note that the measurement data of the steam trap 5 measured by the measuring part 35 is wirelessly transmitted to the terminal controlling device 2.

[1-3. Example of Hardware Configuration of Terminal Control System]

[1-3-1. Example of Hardware Configuration of Terminal Controlling Device 2]

Figure 3:
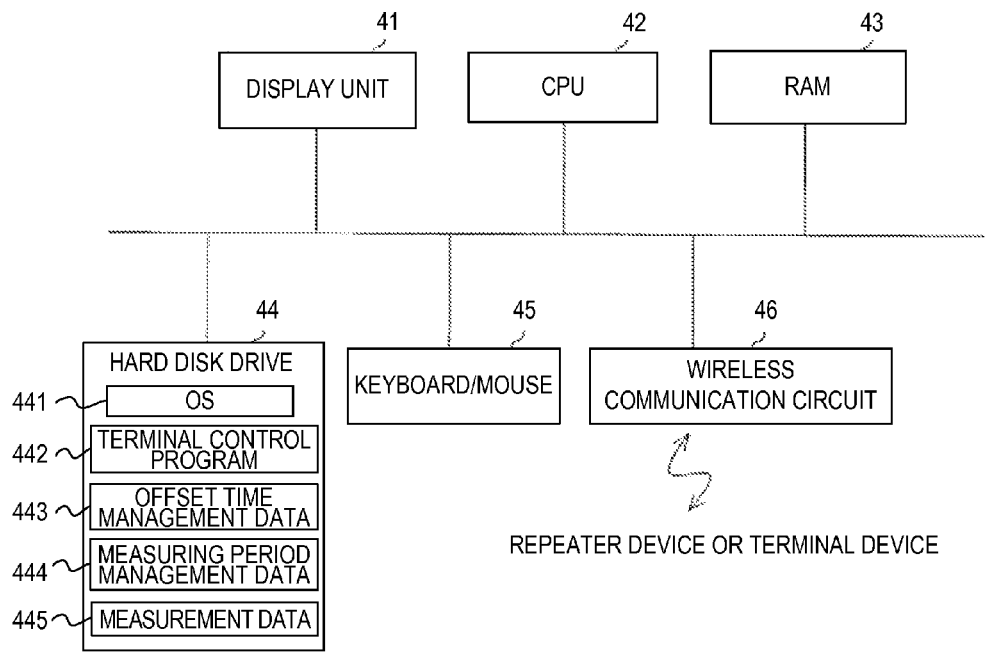
FIG. 3 is a view illustrating one example of a hardware configuration of a terminal controlling device 2 which is implemented using a CPU, etc.

FIG. 3 is a view illustrating one example of a hardware configuration of the terminal controlling device 2 which is implemented using a CPU, etc. For example, the terminal controlling device 2 can be comprised of a laptop-type personal computer.

The terminal controlling device 2 includes a display unit 41, a CPU 42, a RAM (Random Access Memory) 43, a hard disk drive 44, a keyboard/mouse 45, and a wireless communication circuit 46.

The display unit 41 can display entries from the keyboard/mouse 45, the measurement data, etc. The CPU 42 can execute a terminal control program 442 stored in the hard disk drive 44. The RAM 43 can provide the CPU 42 with address spaces.

The hard disk drive 44 can store an OS (operating system) 441, a terminal control program 442, offset time management data 443, measuring period management data 444, and measurement data 445, etc. The keyboard/mouse 45 can receive a user's input operation for controlling the terminal device 3. The wireless communication circuit 46 can wirelessly communicate with the terminal device 3 or the repeater device 4.

The communication time calculator 21 and the offset time calculator 22 which constitute the terminal controlling device 2 illustrated in FIG. 2 are implemented by executing the terminal control program 442 on the CPU 42. The offset time manager 23, the measuring period manager 24, and the measurement data memory 25 correspond to areas assigned to the offset time management data 443, the measuring period management data 444, and the measurement data 445 on the hard disk drive 44, respectively.

[1-3-2. Example of Hardware Configuration of Terminal Device 3]

Figure 4:
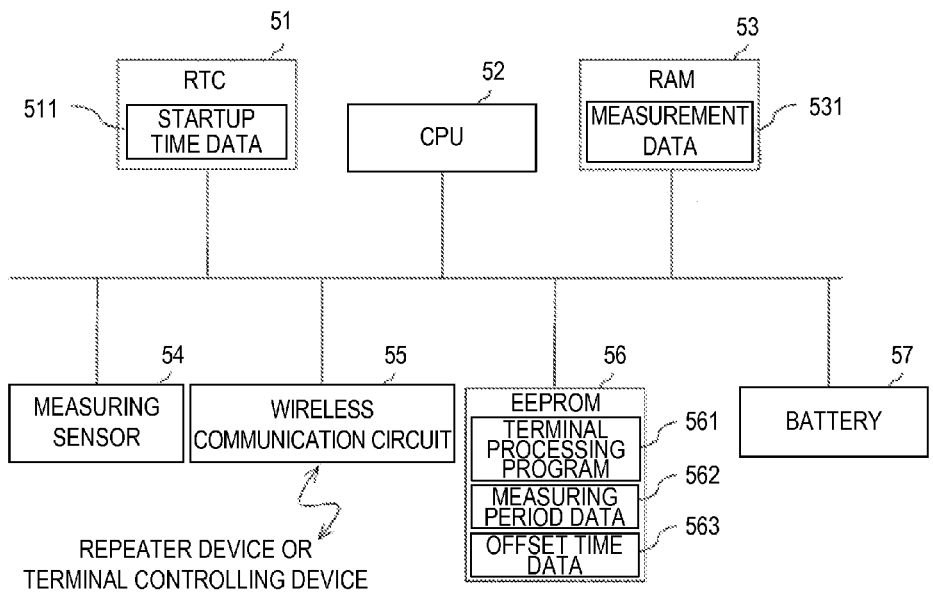
FIG. 4 is a view illustrating one example of a hardware configuration of a terminal device 3 which is implemented using a CPU, etc.

FIG. 4 is a view illustrating one example of a hardware configuration of the terminal device 3 which is implemented using a CPU, etc. The terminal device 3 includes an RTC (Real Time Clock) 51, a CPU 52, a RAM 53, a measuring sensor 54, a wireless communication circuit 55, and an EEPROM (Electrically Erasable and Programmable Read Only Memory) 56, and a battery 57.

The RTC 51 can provide data indicative of the current time by using a clock function, and can start up the terminal device 3 at a time corresponding to preset startup time data 511 by a timer function. The CPU 52 can execute a terminal processing program 561 stored in the EEPROM 56. The RAM 53 can provide the CPU 52 with address spaces and store measurement data 531, etc.

The measuring sensor 54 can measure the operating state of the steam trap 5, for example, by a vibration sensor using a piezoelectric element and/or a temperature sensor using a thermocouple. The wireless communication circuit 55 can communicate with the terminal controlling device 2 or the repeater device 4. The EEPROM 56 can store the terminal processing program 561, the measuring period data 562, and the offset time data 563. The battery 57 can supply power to each component of the terminal device 3. The battery 57 corresponds to a dry cell battery or a secondary battery, for example.

The startup time calculator 32 which constitutes the terminal device 3 illustrated in FIG. 2 is implemented by executing the terminal processing program 561 on the CPU 52. The offset time memory 31 and the measuring period memory 33 correspond to the offset time data 563 and the measuring period data 562 of the EEPROM 56, respectively. The startup controller 34 corresponds to the RTC 51. The measuring part 35 corresponds to the measuring sensor 54.

[1-4. Flowchart of Initialization Processing]

Figure 5:
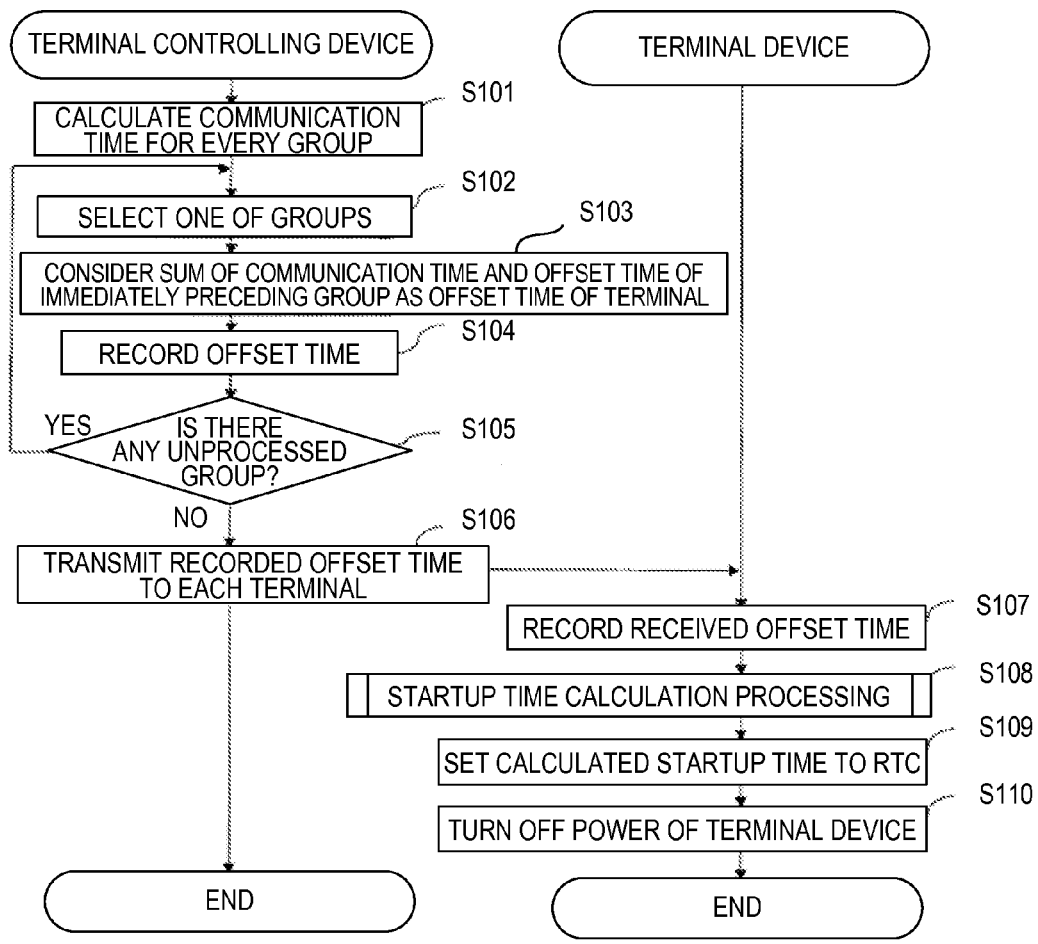
FIG. 5 is a view illustrating one example of a flowchart of initialization processing in the terminal control system 1.

FIG. 5 is a view illustrating one example of a flowchart of initialization processing in the terminal control system 1. Note that in the following, one example in which the terminal controlling device 2 and the terminal device 3 cooperate to perform processing will be described; however, these two devices do not necessarily cooperate to perform the processing. For example, after the terminal controlling device 2 performs Steps S101-S106, the terminal device 3 does not need to cooperatively perform processings of Steps S107-S110.

When the user of the terminal controlling device 2 operates the keyboard/mouse 45 to input an instruction for starting the initialization processing, the CPU 42 of the terminal controlling device 2 calculates a communication time for every group of the terminal device(s) 3 (Step S101). The CPU 42 calculates the communication time for every group, for example, based on the number of hops according to the number of repeater devices 4 via which the terminal controlling device 2 and the terminal device 3 communicate.

Particularly, as illustrated in FIG. 1, the number of hops of the terminal device 3a belonging to Group 1 is "5 (in FIG. 1, it corresponds to the number indicated in parentheses along a line which connects the terminal device 3a and the repeater device 4)." Similarly, the number of hops of the terminal device 3b belonging to Group 1 is "4," and the numbers of hops of the terminal devices 3c-3e belonging to Group 1 are "3," respectively. Therefore, the total number of hops of Group 1 is "18" which is a sum of the numbers of hops of the terminal devices 3a-3e.

If the communication time per hop is, for example, "0.5 seconds," the communication time of Group 1 (i.e., the sum of the communication times of all the terminal devices belonging to Group 1) can be calculated as "9 seconds" which is obtained by multiplying the total number of hops "18" by the communication time per hop "0.5 seconds."

Similarly, since the numbers of hops of the terminal devices 3f and 3g belonging to Group 2 are "3," respectively, the total number of hops of Group 2 is "6" which is a sum of the numbers of hops of the terminal devices 3f and 3g. Therefore, the communication time of Group 2 (i.e., the sum of communication times of all the terminal devices belonging to Group 2) is "3 seconds" which is obtained by multiplying the total number of hops "6" by the communication time per hop "0.5 seconds."

Similarly, since the number of hops of the terminal device 3h belonging to Group 3 is "4" and the numbers of hops of the terminal devices 3i and 3j belonging to Group 3 are "5,"

respectively, the total number of hops of Group 3 is "14" which is a sum of the numbers of hops of the terminal devices 3h-3j. Therefore, the communication time of Group 3 (i.e., the sum of communication times of all the terminal devices belonging to Group 3) is "7 seconds" which is obtained by multiplying the total number of hops "14" by the communication time per hop "0.5 seconds."

As described above, the communication time of Group 1 is calculated as "9 seconds," the communication time of Group 2 as "3 seconds," the communication time of Group 3 as "7 seconds," respectively.

The CPU 42 selects one of the groups of the terminal devices 3 (Step S102). For example, a selecting order of the groups can be determined as such an order that the terminal devices and the repeater devices can efficiently be operated. In this embodiment, the groups are selected in an order of Group 1, Group 2, and Group 3.

The CPU 42 calculates an offset time of each terminal device belonging to the current group based on the communication time and the offset time of the immediately preceding group (Step S103). For example, the CPU 42 can consider a total of, a sum of the communication times of all the terminal devices 3 belonging to the immediately preceding group, and the offset time of each terminal device 3 belonging to the immediately preceding group, as an offset time of each terminal device belonging to the current group. Note that since the immediately preceding group does not exist when Group 1 is selected, a predetermined value, for example, "5 seconds" is set as the offset time of the terminal device 3 belonging to Group 1. Alternatively, predetermined values other than "5 seconds" may also be set as the offset time.

The CPU 42 records the offset time calculated as above as the offset time management data 443 on the hard disk drive 44 so as to be associated with each group (Step S104). FIG. 6 is a view illustrating one example of the offset time management data 443. The CPU 42 records, for example, "5 seconds" as the offset time of Group 1.

The CPU 42 determines whether there is any unprocessed group (Step S105). If there is any unprocessed group, the CPU 42 returns to Step S102 described above, and repeats the processing (determined as Yes at Step S105).

If Group 2 is selected at Step S102 described above, the CPU 42 sets "14 seconds" which is a total of the communication time of Group 1 which is an immediately preceding group "9 seconds" and the offset time of Group 1 "5 seconds" as an offset time of each terminal device 3 belonging to Group 2 at Step S103.

If Group 3 is selected at Step S102 described above, the CPU 42 sets "17 seconds" which is a total of the communication time of Group 2 which is an immediately preceding group "3 seconds" and the offset time of Group 2 "14 seconds" as an offset time of each terminal device 3 belonging to Group 3 at Step S103.

Thus, the CPU 42 sets the total of the communication time and the offset time of the immediately preceding group as the offset time of another group which successively communicates after the immediately preceding group. For example, the CPU 42 records "14 seconds" as the offset time of Group 2, and "17 seconds" as the offset time of Group 3, respectively.

Figure 7:
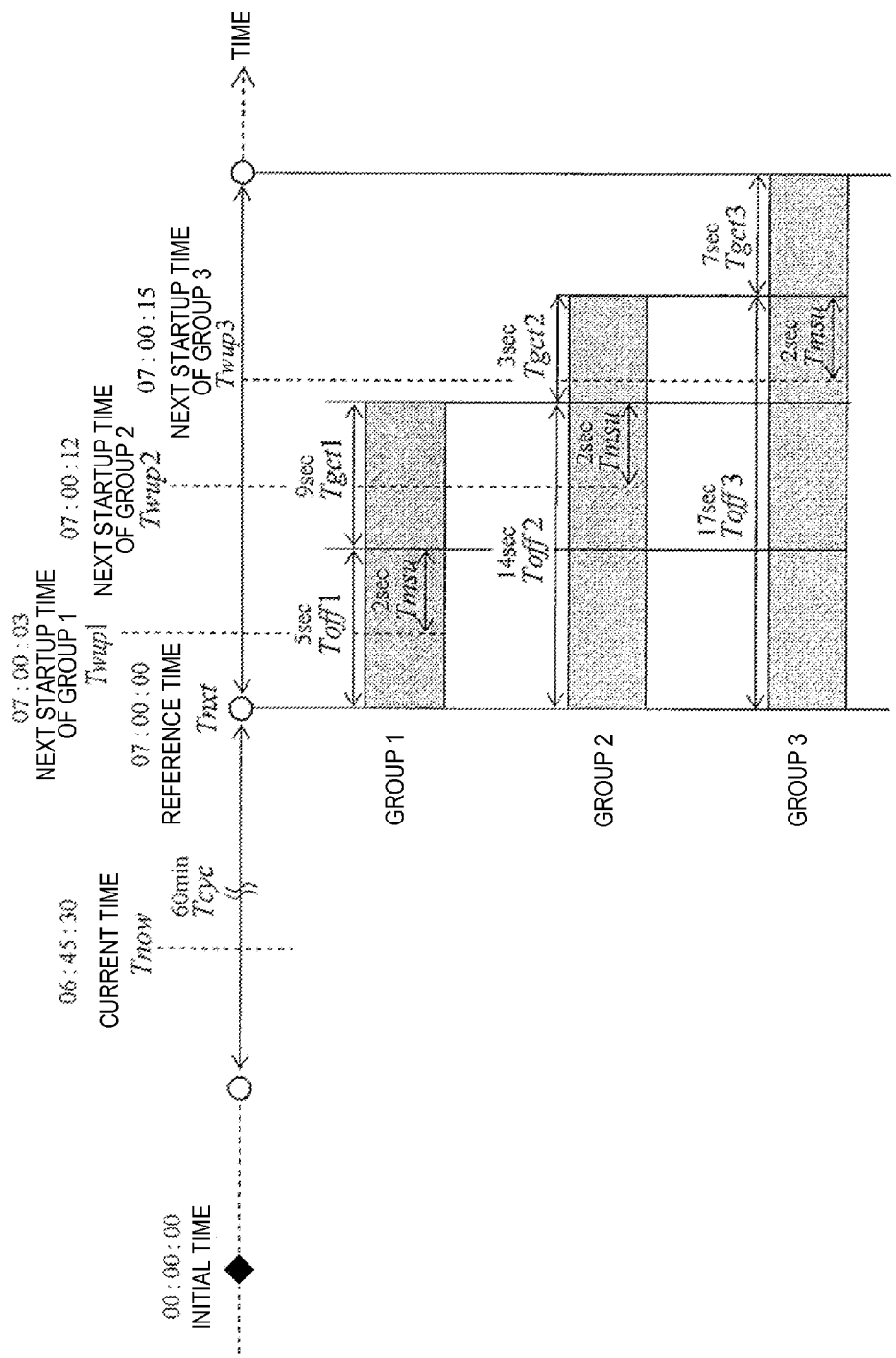
FIG. 7 is a view schematically illustrating one example of processing when calculating a startup time of the terminal device 3.

FIG. 7 is a view schematically illustrating one example of processing when calculating the startup time of the terminal device 3. As illustrated in FIG. 7, offset times Toff1 (5 seconds), Toff2 (14 seconds), and Toff3 (17 seconds) recorded corresponding to each group are set, respectively.

The CPU 42 transmits to each terminal device 3 belonging to each group, the offset time recorded so as to be associated with each group (Step S106). Note that a correspondence table (not illustrated) of the groups and the terminal devices is recorded in the terminal controlling device 2 in advance so as to be recognizable by the CPU 42.

For example, the CPU 42 transmits the offset time "5 seconds" to the terminal devices 3a-3e belonging to Group 1, transmits the offset time "14 seconds" to the terminal devices 3f and 3g, and transmits the offset time "17 seconds" to the terminal devices 3h-3j.

As described above, the terminal controlling device 2 and the terminal device 3 do not necessarily cooperate with each other. For example, the user of the terminal controlling device 2 may cause the terminal controlling device 2 to execute the processings at Steps S101-S105 described above at a place distant from a steam piping installation where the steam trap 5 to be measured is installed, and the user may then move near the steam piping installation where the steam trap 5 is installed to cause the terminal controlling device 2 to execute the processing at Step S106 described above.

When the CPU 52 of each terminal device 3 receives the offset time from the terminal controlling device 2, the CPU 52 records the received offset time as the offset time data 563 of the EEPROM 56 (Step S107). FIGS. 8A, 8B, and 8C are views illustrating examples of the measuring period data and the offset time data recorded on the EEPROM 56 of the terminal device 3 belonging to each of Groups 1-3.

For example, each CPU 52 of the terminal devices 3a-3e belonging to Group 1 records "5 seconds" 72 as the offset time of the corresponding terminal device. For example, each CPU 52 of the terminal devices 3f and 3g belonging to Group 2 records "14 seconds" 72 as the offset time of the corresponding terminal device. For example, each CPU 52 of the terminal devices 3h-3i belonging to Group 3 records "17 seconds" 72 as the offset time of the corresponding terminal device.

Figure 9:
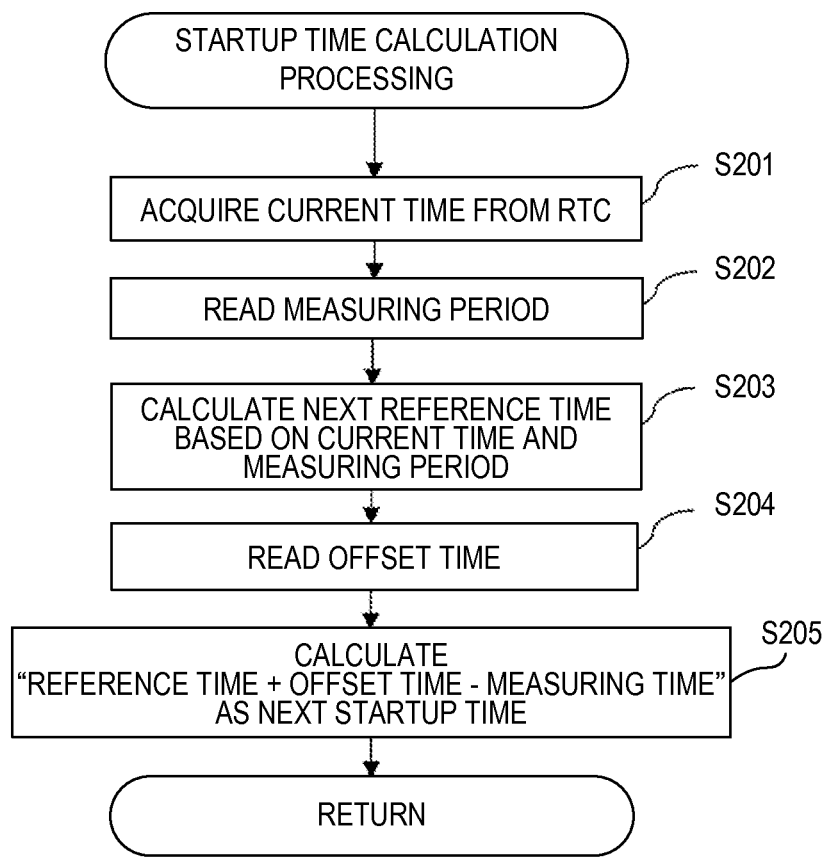
FIG. 9 is a view illustrating one example of a flowchart of a subroutine of startup time calculation processing in the terminal device 3.

The CPU 52 executes startup time calculation processing by a subroutine (Step S108). FIG. 9 is a view illustrating one example of a flowchart of the subroutine of the startup time calculation processing in the terminal device.

The CPU 52 acquires the current time from the RTC (Step S201). For example, as illustrated in FIG. 7, the CPU 52 acquires "06:45:30 (hour:minute:second)" as the current time Tnow.

The CPU 52 reads the measuring period (Step S202). For example, the CPU 52 reads "60 minutes" from the measuring period data 562a illustrated in FIG. 8A. Note that each data of the measuring period data 562a-562c illustrated in FIGS. 8A-8C is set to each terminal device 3 of the corresponding group in advance. For example, the measuring period data corresponding to the terminal device 3 may be transmitted from the terminal controlling device 2 in the initialization processing described above.

The CPU 52 calculates the next reference time based on the current time and the measuring period (Step S203). Note that, as illustrated in FIG. 7, an initial time which is an origin when all the terminal devices 3 calculate the startup times is set to "00:00:00." Note that the initial time may be any time other than the initial time described above as long as it is a time which is set in common for all the terminal devices 3.

The CPU 52 determines as the next reference time, for example, a time which is a future time with respect to the current time and closest to the current time among times which are multiples of the measuring period reckoned from the initial time. As illustrated in FIG. 7, if the initial time is "00:00:00," the current time Tnow is "06:45:30" and the measuring period Tcyc is "60 minutes," the reference time Tnxt can be calculated as "07:00:00."

The CPU 52 reads the offset time recorded as the offset time data 563 of the EEPROM 56 (Step S204). For example, the CPUs 52 of the terminal devices 3*a*-3*e* belonging to Group 1 read "5 seconds" as the offset time from the offset time data 563*a* illustrated in FIG. 8A.

The CPU 52 calculates a time (next startup time) at which the terminal device 3 is to be started up next time, based on the reference time, the offset time, and the measuring time (Step S205). Here, it is assumed that "2 seconds" is set for the measuring time, which is long enough for the measuring sensor 54 of the terminal device 3 to measure the operating state of the steam trap. Note that the measuring time may be longer or shorter than "2 seconds."

For example, each CPU 52 of the terminal devices 3*a*-3*e* belonging to Group 1 calculates as the next startup time of itself, "07:00:03" which is a time obtained by adding the offset time "5 seconds" 563*a* of the terminal device 3 belonging to Group 1 illustrated in FIG. 8A to the reference time Tnxt "07:00:00" and subtracting the measuring time "2 seconds" of the measuring sensor 54 described above.

Similarly, for example, each CPU 52 of the terminal devices 3*f* and 3*g* belonging to Group 2 calculates as the next startup time of itself, "07:00:12" which is a time obtained by adding the offset time "14 seconds" 563*b* of the terminal device 3 belonging to Group 2 illustrated in FIG. 8B to the reference time Tnxt "07:00:00" and subtracting the measuring time "2 seconds" of the measuring sensor 54 described above.

Similarly, for example, each CPU 52 of the terminal devices 3*h*-3*j* belonging to Group 3 calculates as the next startup time of itself, "07:00:15" which is a time obtained by adding the offset time "17 seconds" 563*c* of the terminal device 3 belonging to Group 2 illustrated in FIG. 8C to the reference time Tnxt "07:00:00" and subtracting the measuring time "2 seconds" of the measuring sensor 54 described above.

When the subroutine processing of FIG. 9 ends, the CPU 52 returns to Step S109 of FIG. 5 to set the calculated next startup time to the RTC. For example, each CPU 52 of the terminal devices 3*a*-3*e* belonging to Group 1 sets the next startup time "07:00:03" to the startup time data 511 of the RTC 51.

Similarly, each CPU 52 of the terminal devices 3*f* and 3*g* belonging to Group 2 sets the next startup time "07:00:12" to the startup time data 511 of the RTC 51. Further, each CPU 52 of the terminal devices 3*h*-3*j* belonging to Group 3 sets the next startup time "07:00:15" to the startup time data 511 of the RTC 51.

After the next startup times are set to the RTC 51, the CPUs 52 turn off the power of the terminal devices 3. Thus, since the terminal devices 3 will not wake up until the next startup times come, battery consumptions can be reduced. Note that the state in which the power of the terminal device 3 is turned off may be referred to as "the sleeping state." When it is in the sleeping state, the power is supplied to the RTC 51 of the terminal device 3 and, thus, the timer function of the RTC 51 is in its operable state.

[1-5. Flowchart of Measurement Processing]

Figure 10:
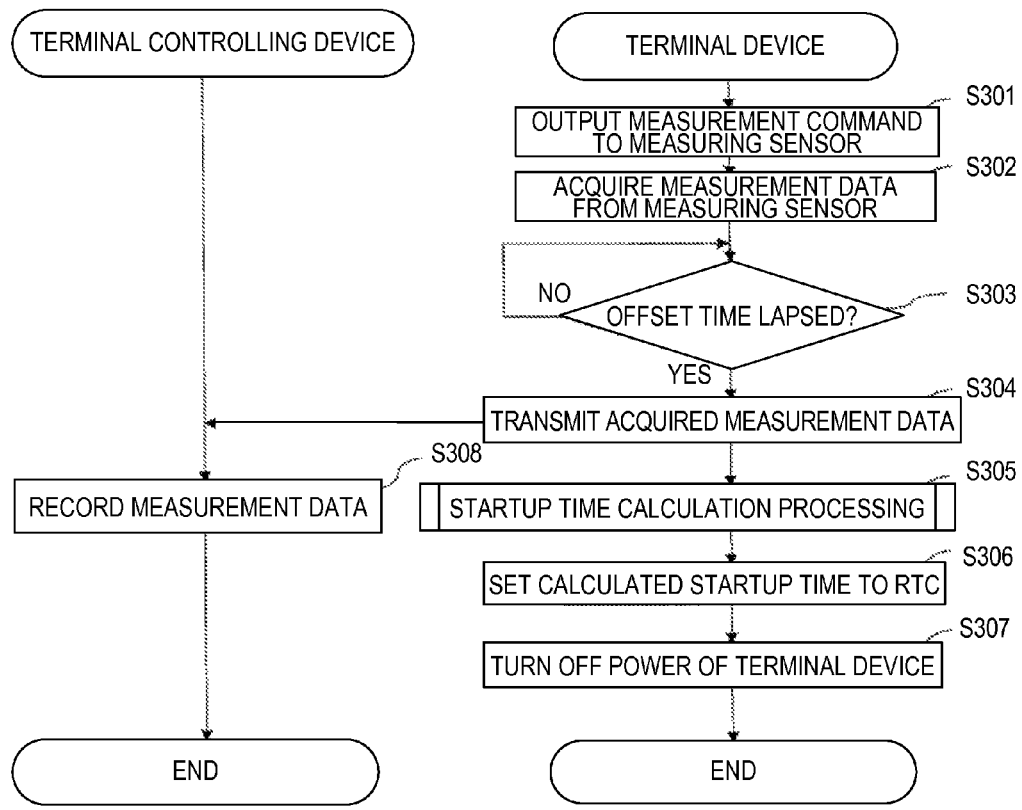
FIG. 10 is a view illustrating one example of a flowchart of measurement processing in the terminal control system 1.

FIG. 10 is a view illustrating one example of a flowchart of measurement processing according to the terminal control system 1.

As described above, the terminal device 3 starts up at the startup time which is set to the RTC 51. Particularly, the power is supplied to each component of the terminal device 3 from the battery 57 in response to a startup signal which is transmitted by the timer function of the RTC 51 to start the terminal device 3.

When the power is supplied from the battery 57, the CPU 52 of the terminal device 3 outputs a measurement command to the measuring sensor 54 (Step S301). If the measuring sensor 54 is a temperature sensor, outer surface temperature of the steam trap 5 is measured by the thermocouple, for example.

Alternatively, if the measuring sensor 54 is a vibration sensor, operating sound which is generated when a valve disc provided in the steam trap 5 operates, and/or vibration due to ultrasonic waves which is generated when steam vigorously flows through an internal passage of the steam trap 5, are measured by the piezoelectric element, for example.

Note that the measuring sensor 54 may be multifunctionally provided with both the temperature sensor and the vibration sensor. Alternatively, the measuring sensor 54 may be provided with other sensors independently or multifunctionally.

The CPU 52 acquires the measurement data from the measuring sensor 54 (Step S302). The CPU 52 acquires, for example, the temperature data and/or the vibration data, and records them as the measurement data 531 of the RAM 53.

The CPU 52 determines whether the offset time is lapsed, and if determined that the offset time is lapsed (determined as Yes at Step S303), the CPU 52 transmits the acquired measurement data to the terminal controlling device 2 (Step S304). The CPU 52 wirelessly transmits, for example, the temperature data and/or the vibration data recorded as the measurement data 531 of the RAM 53 to the terminal controlling device 2 by using the wireless communication circuit 55. Note that in actual cases, the measurement data is wirelessly transmitted to the terminal controlling device 2 via one or more repeater devices 4.

Figure 11:
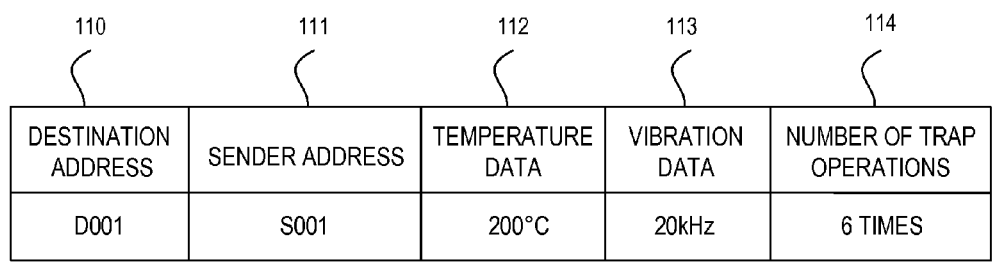
FIG. 11 is a view illustrating one example of measurement data transmitted from the terminal device 3 to the terminal controlling device 2.

FIG. 11 is a view illustrating one example of the measurement data 531 transmitted from the terminal device 3 to the terminal controlling device 2. In FIG. 11, a destination address 110 "D001" indicates data for identifying the repeater device 4, for example. A sender address 110 "S001" indicates data for identifying the terminal device 3, for example. The temperature data 112 "200° C." indicates temperature data acquired from the measuring sensor 54 (temperature sensor), for example. The vibration data 113 "20 kHz" indicates vibration data acquired from the measuring sensor 54 (vibration sensor), for example.

Note that the number of trap operations 114 "6 times" indicates the number of operations of the steam trap 5 which is calculated based on the vibration data acquired from the measuring sensor 54 (vibration sensor), for example. The number of operations of the steam trap 5 can be the number of times a value indicative of the vibration frequency becomes maximums (peaks), based on the history of the vibration data acquired by the present time after the last measurement data transmission, for example. The determination of the operating state of the steam trap 5 can be compensated by using the data of the number of operations of the steam trap 5.

In response to the transmission from the terminal device 3, the CPU 42 of the terminal controlling device 2 records the measurement data (Step S308). The CPU 42 records, for example, the temperature data and/or the vibration data received from the terminal device 3 as the measurement data 445 of the hard disk drive 44 of the terminal controlling device 2. Note that in actual cases, the measurement data is wirelessly transmitted from the terminal device 3 via one or more repeater devices 4. Further, the measurement data 445 has a similar format to the measurement data 531 illustrated in FIG. 11, and a plurality of measurement data 531 from different senders are recorded as the measurement data 445.

The CPU 52 of the terminal device 3 executes startup time calculation processing by a subroutine (Step S305). Note that the startup time calculation processing executed herein is similar to that of the flowchart illustrated in FIG. 9. However, since the current time is after the reference time when executing the startup time calculation processing at Step S305, a new startup time will be calculated based on a new reference time.

When the startup time calculation processing of FIG. 9 is finished, the CPU 52 sets the calculated next startup time to the RTC (Step S306). Further, after setting the next startup time to the RTC 51, the CPU 52 turns off the power of the terminal device 3. Thus, when the measurement data is transmitted to the terminal controlling device 2, the terminal device 3 calculates the next startup time and sets it to the RTC. The terminal device 3 then turns off the power to transit to the sleeping state. Therefore, the terminal device 3 can reduce the battery consumption until the next startup time comes, thereby achieving power saving of the terminal device.

2. Second Embodiment

Figure 12:
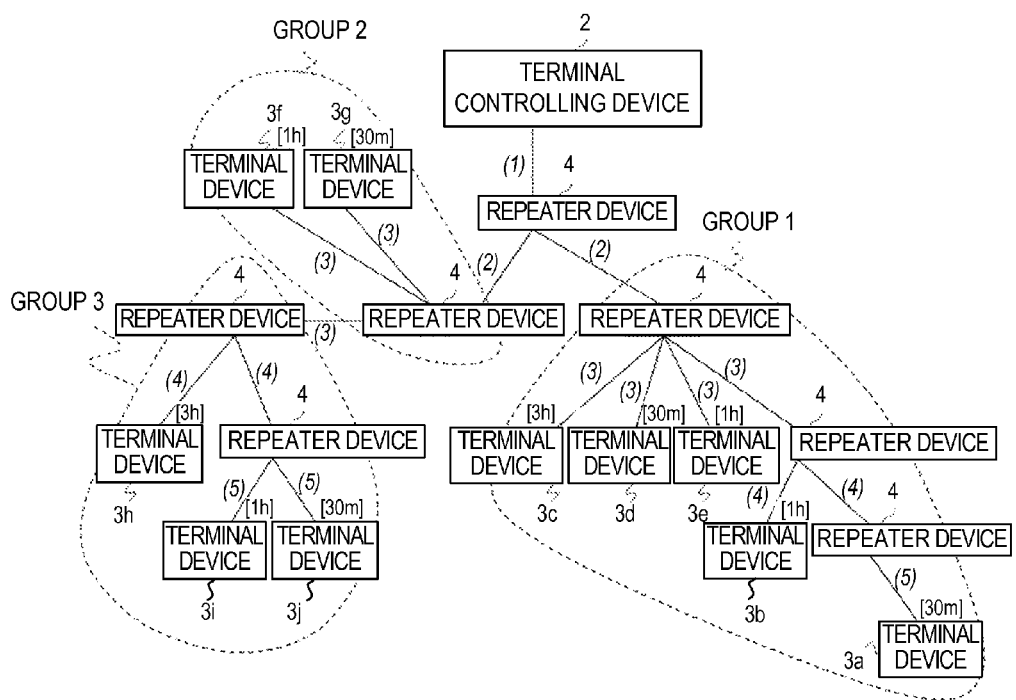
FIG. 12 is a view illustrating one example of the entire configuration of the terminal control system 1.

FIG. 12 is a view illustrating one example of the entire configuration of the terminal control system 1 according to a second embodiment of the present invention. In FIG. 12, a major difference between this embodiment and the first embodiment described above is that the measuring periods of the terminal devices 3 belonging to the same group are different. That is, the measuring period is set only to "60 minutes" in the first embodiment; however, the measuring period is set to any one of "30 minutes," "1 hour" and "3 hours" in the second embodiment. Note that components which are common to those of the first embodiment described above are denoted with the same reference numerals to omit redundant descriptions.

[2-1. Entire Configuration of Terminal Control System]

The measuring period is set in advance to each terminal device 3. For example, the measuring period "30 minutes" is set to the terminal device 3a (in FIG. 12, the measuring period "30 minutes" is indicated as [30 m]). Similarly, the measuring period "1 hour" is set to the terminal device 3b, for example (in FIG. 12, the measuring period "1 hour" is indicated as [1 h]). Similarly, the measuring period "3 hours" is set to the terminal device 3c, for example (in FIG. 12, the measuring period "3 hours" is indicated as [3 h]).

Thus, in this embodiment, different measuring periods may be set to the terminal devices belonging to the same group. Note that, In FIG. 12, although three kinds of measuring periods, "30 minutes," "1 hour" and "3 hours," are set, more or less kinds of measuring periods may be set.

The terminal device 3 executes measurement processing at every set measuring period, respectively. For example, the terminal device 3a executes the measurement processing at every "30 minutes," the terminal device 3b executes the measurement processing at every "1 hour," and the terminal device 3c executes the measurement processing at every "3 hours."

That is, for example, all the terminal devices 3a-3c execute the measurement processings within a timing period in which "3 hours" or a multiple of 3 hours (6 hours, 9 hours, 12 hours, 15 hours, 18 hours, etc.) being lapsed from the initial time is used as the reference time, respectively.

Further, for example, the terminal devices 3a and 3b execute the measurement processings within a timing period in which 1 hour and a multiple of 1 hour (except for a multiple of 3 hours) being lapsed from the initial time is used as the reference time. Further, for example, only the terminal device 3a executes the measurement processing within a timing period in which 30 minutes and a multiple of 30 minutes (except for a multiple of 60 minutes or 180 minutes) being lapsed from the initial time is used as the reference time.

If the measuring periods are set as described above, the terminal devices 3 having different measuring periods may execute the measurement processings during the same period. In such a case, since many terminal devices 3 may transmit the measurement data to the terminal controlling device 2 at the same time depending on the measuring periods, communication latency of the terminal devices 3 may be extended. If the communication latency is extended, the power consumptions of the terminal devices 3 increase, and thereby the batteries 57 do not last. For this reason, in this embodiment, if the timings at which the terminal devices 3 having different measuring periods execute the measurement processings are overlapped to each other, the offset time is determined so that the communication latency of each terminal device 3 becomes as short as possible, thereby achieving the power saving of the terminal device 3.

[2-2. Functional Block Diagram of Terminal Control System]

Figure 13:
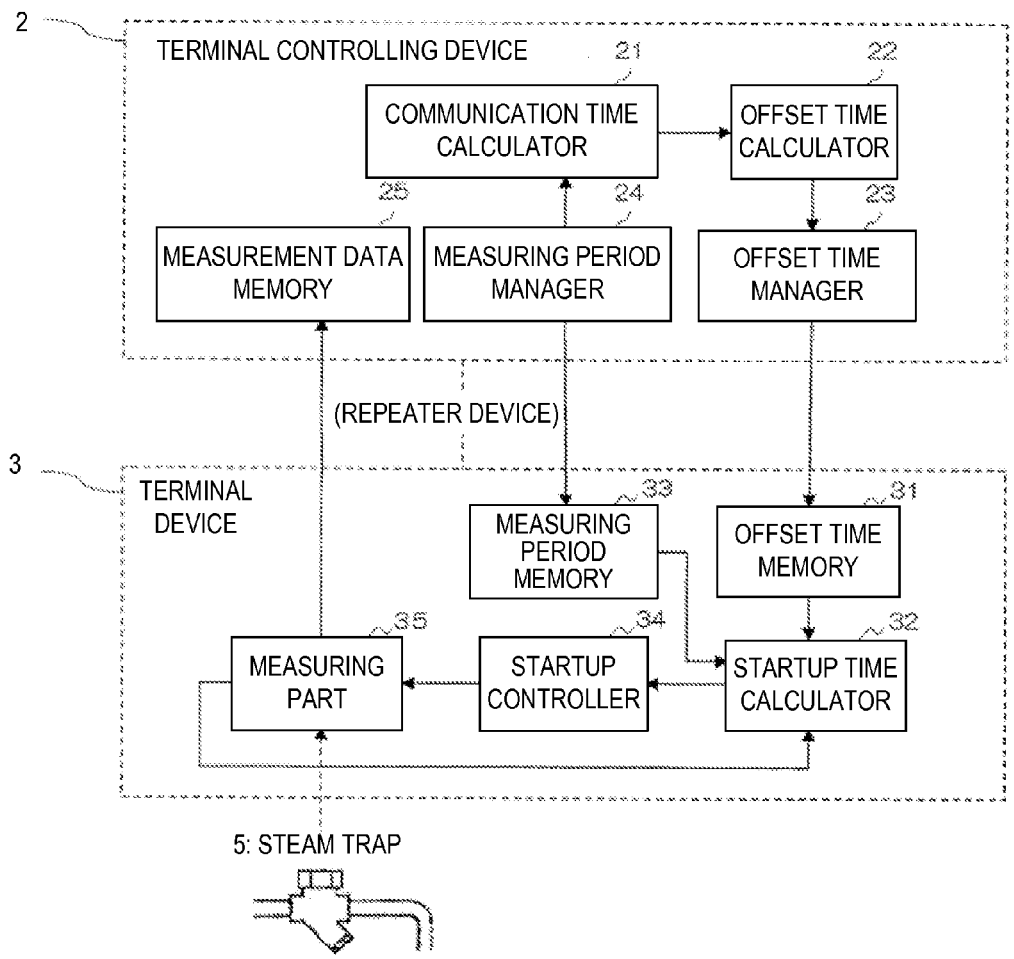
FIG. 13 is a view illustrating one example of the functional block diagram of the terminal control system 1.

FIG. 13 is a view illustrating one example of the functional block diagram of the terminal control system 1 according to the second embodiment. FIG. 13 is fundamentally the same as what illustrated in FIG. 2; however, FIG. 13 is different from the FIG. 2 as follows.

[2-2-1. Functional Block Diagram of Terminal Controlling Device 2]

The communication time calculator 21 of the terminal controlling device 2 according to the second embodiment can calculate the communication time of the terminal device 3 at every measuring period acquired from the measuring period manager 24.

The offset time calculator 22 of the terminal controlling device 2 according to the second embodiment can calculate, assuming that, for example, two terminal devices 3 which belong to different groups and have the same measuring period execute the terminal processings within a timing period of the same reference time, the offset time of the latter terminal device 3 so that the offset time of the latter terminal device 3 is the same as the communication time of the former terminal device 3.

Further, the offset time calculator 22 of the terminal controlling device 2 according to the second embodiment can calculate as the offset time of the entire group, a sum of the offset times of the terminal devices 3 calculated under the assumption described above, when the terminal devices 3 having different measuring periods among the terminal devices 3 belonging to the same group execute the terminal processings within the timing period of the same reference time.

The offset time manager 23 of the terminal controlling device 2 according to the second embodiment can manage, for example, the offset time calculated as above so as to be associated with the group to which each terminal device 3 belongs and the measuring period.

The measuring period manager 24 of the terminal controlling device 2 according to the second embodiment can manage, for example, the measuring periods set for every group to which the terminal device 3 belong so that the measuring periods are associated with the respective terminal devices 3. Note that the data indicative of the measuring period managed by the measuring period manager 24 is wirelessly transmitted to each corresponding terminal device 3.

[2-2-2. Functional Block Diagram of Terminal Device 3]

The offset time memory 31 of the terminal device 3 according to the second embodiment can record, for example, the offset times at every measuring period calculated by the terminal controlling device 2.

The measuring period memory 33 of the terminal device 3 according to the second embodiment can record, for example, at least one measuring period of the terminal device 3 managed by the terminal controlling device 2.

[2-3. Example of Hardware Configuration of Terminal Control System]

An example of a hardware configuration of the terminal controlling device 2 is similar to that illustrated in FIG. 3. The example of the hardware configuration of the terminal device 3 is similar to that illustrated in FIG. 4.

[2-4. Flowchart of Initialization Processing]

Figure 14:
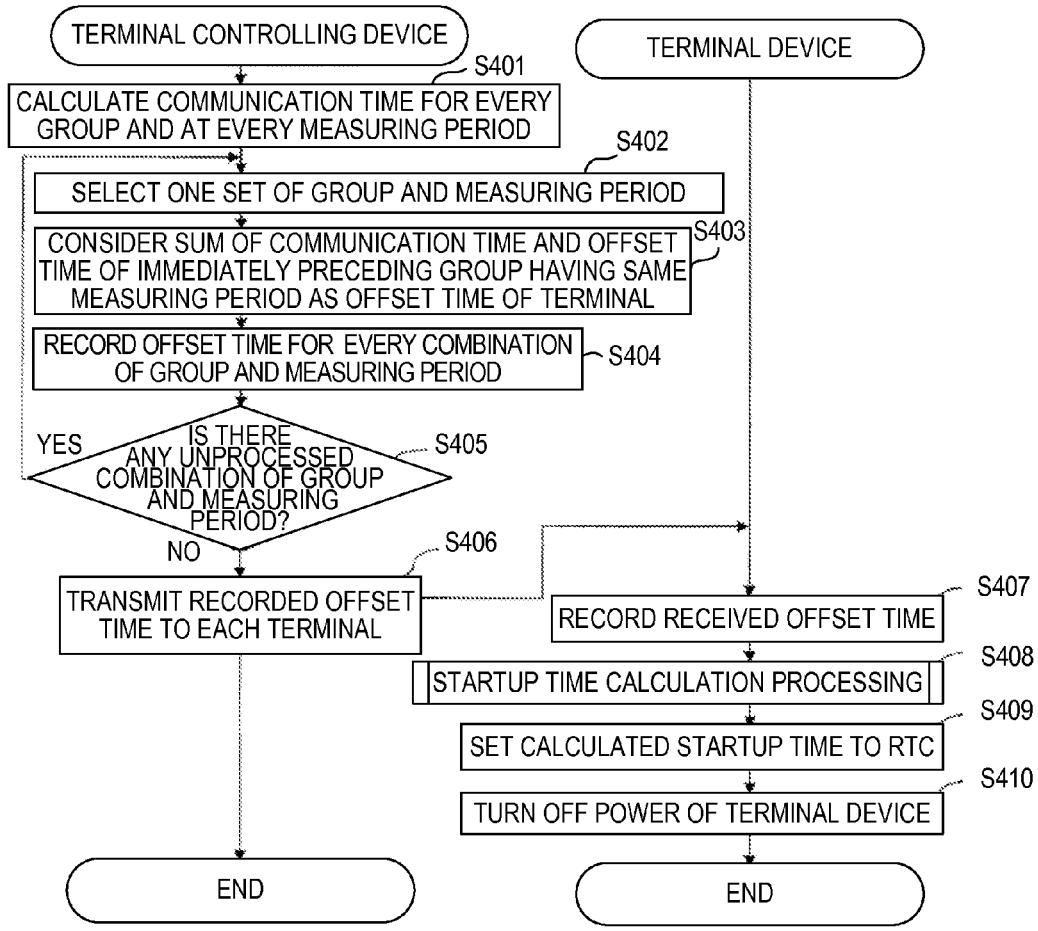
FIG. 14 is a view illustrating one example of a flowchart of the initialization processing in the terminal control system 1.

FIG. 14 is a view illustrating one example of a flowchart of the initialization processing in the terminal control system 1 according to the second embodiment.

When the instruction for causing the initialization processing to start is inputted by the user of the terminal controlling device 2 operating the keyboard/mouse 45, the CPU 42 of the terminal controlling device 2 calculates the communication time for every group to which the terminal device 3 belongs and at every measuring period (Step S401).

For example, similar to the first embodiment, the CPU 42 calculates the communication time for every group and at every measuring period based on the number of hops according to the number of repeater devices 4 via which the terminal controlling device 2 and the terminal device 3 communicate with each other.

Particularly, as illustrated in FIG. 12, all the terminal devices 3 which belong to Group 1 and have the measuring period of "30 minutes (30 m)" are the measurement terminals 3a and 3d (hereinafter, for example, may be referred to as "all the terminal devices 3 according to Group 1 and the measuring period '30 minutes'"). Here, since the number of hops of the measurement terminal 3a is "5" and the number of hops of the terminal device 3d is "3," a sum number of hops of the terminal devices 3 according to Group 1 and the measuring period "30 minutes" is "8" which is a sum of the number of hops of the terminal devices 3a and 3d.

If the communication time per hop is, for example, "0.5 seconds," similar to the first embodiment, the communication time of all the terminal devices 3 according to Group 1 and the measuring period "30 minutes" (i.e., the sum of the communication times of all the terminal devices 3 which belong to Group 1 and have the measuring period of "30 minutes") can be calculated as "4 seconds" which is obtained by multiplying the sum number of hops "8" by the communication time per hop "0.5 seconds."

Similarly, since all the terminal devices 3 according to Group 2 and the measuring period "30 minutes" correspond only to the terminal device 3g, the sum number of hops of all the terminal devices 3 according to Group 2 and the measuring period "30 minutes" is "3" which is the number of hops of the terminal device 3g. Therefore, the communication time of all the terminal devices 3 according to Group 2 and the measuring period "30 minutes" (i.e., the sum of the communication times of all the terminal devices which belong to Group 2 and have the measuring period of "30 minutes") is "1.5 seconds" which is obtained by multiplying the sum number of hops "3" by the communication time per hop "0.5 seconds."

Similarly, since all the terminal devices 3 according to Group 3 and the measuring period "30 minutes" correspond only to the terminal devices 3j, the sum number of hops of the terminal device 3 according to Group 3 and the measuring period "30 minutes" is "5" which is the number of hops of the terminal device 3j. Therefore, the communication time of all the terminal devices 3 according to Group 3 and the measuring period "30 minutes" (i.e., the sum of the communication times of all the terminal devices which belong to Group 3 and have the measuring period of "30 minutes") is "2.5 seconds" which is obtained by multiplying the sum number of hops "5" by the communication time per hop "0.5 seconds."

As described above, the communication time of all the terminal devices 3 according to Group 1 and the measuring period "30 minutes" is calculated as "4 seconds," the communication time of all the terminal devices 3 according to Group 2 and the measuring period "30 minutes" as "1.5 seconds," and the communication time of all the terminal devices 3 according to Group 3 and the measuring period "30 minutes" as "2.5 seconds," respectively.

Similar to the above, the communication time of all the terminal devices 3 according to Group 1 and the measuring period "1 hour" is calculated as "3.5 seconds," the communication time of all the terminal devices 3 according to Group 2 and the measuring period "1 hour" as "1.5 seconds," and the communication time of all the terminal devices 3 according to Group 3 and the measuring period "3 hours" as "2.5 seconds," respectively.

Similar to the above, the communication time of all the terminal devices 3 according to Group 1 and the measuring period "3 hours" is calculated as "1.5 seconds," the communication time of all the terminal devices 3 according to Group 2 and the measuring period "3 hours" as "0 second," and the communication time of all the terminal devices 3 according to Group 3 and the measuring period "3 hours" as "2 seconds," respectively.

The CPU 42 selects one set of the group and the measuring period of the terminal devices 3 (Step S402). In this embodiment, the groups are selected one by one in the order of Group 1, Group 2, and Group 3, the measuring periods are selected one by one in the order of "30 minutes," "1 hour" and "3 hours" along with each group. That is, in a first increment, a combination of Group 1 and the measuring period "30 minutes" is selected, and in the final increment, a combination of Group 3 and the measuring period "3 hours" is selected.

The CPU 42 calculates, based on the communication time and the offset time calculated for every combination of the group and the measuring period which are calculated as above, the offset time of the terminal device 3 which belongs to a subsequent group of the above-described group, and to which the same measuring period as the above-described measuring period is set (Step S403).

For example, the CPU 42 sets a sum of, the sum of the communication times of all the terminal devices 3 which belong to the immediately preceding group and to which the same measuring period is set, and the offset time of each terminal device 3 which belongs to the immediately preceding group and to which the same measuring period is set, as an offset time of each terminal device 3 which belongs to the subsequent group and to which the same measuring period as the above-described measuring period is set. Note that since the immediately preceding group does not exist when Group 1 is selected, a predetermined value "2 seconds" is set as the offset time of the terminal device 3 according to Group 1 and each measuring period, for example. Alternatively, a predetermined value other than "2 seconds" may also be set as the offset time.

The CPU 42 records the offset time calculated as above, as the offset time management data 443 on the hard disk drive 44 so as to associate it with the combination of each group and measuring period (Step S404). FIG. 15 is a view illustrating one example of the offset time management data 443 according to the second embodiment. The CPU 42 records, for example, "2 seconds" as the offset time of each combination of Group 1 and the measuring period "30 minutes," Group 1 and the measuring period "1 hour," Group 1 and the measuring period "3 hours," respectively.

The CPU 42 determines whether there is an unprocessed combination of the group and the measuring period (Step S405). If there is an unprocessed combination of the group and the measuring period (determined as Yes at Step S405), the CPU 42 returns to Step S402 described above to repeat the processings.

If the combination of Group 2 and the measuring period "30 minutes" is selected at Step S402 described above, the CPU 42 sets "6 seconds" which is a sum of the communication time "4 seconds" of the terminal device 3 according to Group 1 which is the immediately preceding group and the measuring period "30 minutes" and the offset time "2 seconds" of the terminal device 3 according to Group 1 and the measuring period "30 minutes," as the offset time of the terminal device 3 according to Group 2 and the measuring period "30 minutes" at Step S403.

If the combination of Group 2 and the measuring period "1 hour" is selected at Step S402 described above, the CPU 42 sets "5.5 seconds" which is a sum of the communication time "3.5 seconds" of the terminal device 3 according to Group 1 which is the immediately preceding group and the measuring period "1 hour," and the offset time "2 seconds" of the terminal device 3 according to Group 1 and the measuring period "1 hour," as the offset time of the terminal device 3 according to Group 2 and the measuring period "1 hour" at Step S403.

If the combination of Group 2 and the measuring period "3 hours" is selected at Step S402 described above, the CPU 42 sets "3.5 seconds" which is a sum of the communication time "1.5 seconds" of the terminal device 3 according to Group 1 which is the immediately preceding group and the measuring period "3 hours," and the offset time "2 seconds" of the terminal device 3 according to Group 1 and the measuring period "3 hours," as the offset time of the terminal device 3 according to Group 2 and the measuring period "3 hours" at Step S403.

If the combination of Group 3 and the measuring period "30 minutes" is selected at Step S402 described above, the CPU 42 sets "7.5 seconds" which is a sum of the communication time "1.5 seconds" of the terminal device 3 according to Group 2 which is the immediately preceding group and the measuring period "30 minutes". and the offset time "6 seconds" of the terminal device 3 according to Group 2 and the measuring period "30 minutes," as the offset time of the terminal device 3 according to Group 3 and the measuring period "30 minutes" at Step S403.

If the combination of Group 3 and the measuring period "1 hour" is selected at Step S402 described above, the CPU 42 sets "7 seconds" which is a sum of the communication time "1.5 seconds" of the terminal device 3 according to Group 2 which is the immediately preceding group and the measuring period "1 hour," and the offset time "5.5 seconds" of the terminal device 3 according to Group 2 and the measuring period "1 hour," as the offset time of the terminal device 3 according to Group 3 and the measuring period "1 hour" at Step S403.

If the combination of Group 3 and the measuring period "3 hours" is selected at Step S402 described above, the CPU 42 sets "3.5 seconds" which is a sum of the communication time "0 second" of the terminal device 3 according to Group 2 which is the immediately preceding group and the measuring period "3 hours," and the offset time "3.5 seconds" of the terminal device 3 according to Group 2 and the measuring period "3 hours," as the offset time of the terminal device 3 according to Group 3 and the measuring period "3 hours" at Step S403.

Thus, the CPU 42 sets the sum of the communication time and the offset time of the terminal device 3 according to the combination of the immediately preceding group and the measuring period, as the offset time of another terminal device 3 of another group which performs a communication successively and to which the same measuring period is set.

For example, as illustrated in FIG. 15, the CPU 42 records "6 seconds" as the offset time of the terminal device 3 according to Group 2 and the measuring period "30 minutes," "5.5 seconds" as the offset time of the terminal device 3 according to Group 2 and the measuring period "1 hour," and "3.5 seconds" as the offset time of the terminal device 3 according to Group 2 and the measuring period "3 hours," respectively.

For example, as illustrated in FIG. 15, the CPU 42 records "7.5 seconds" as the offset time of the terminal device 3 according to Group 3 and the measuring period "30 minutes," "7 seconds" as the offset time of the terminal device 3 according to Group 3 and the measuring period "1 hour," "3.5 seconds" as the offset time of the terminal device 3 according to Group 3 and the measuring period "3 hours," respectively.

The CPU 42 transmits the offset time which is recorded so as to be associated with each group and each measuring period, to each terminal device belonging to each group (Step S406). Note that the correspondence table (not illustrated) of the groups and the measuring periods, and the terminal devices, is recorded in the terminal controlling device 2 in advance so as to be recognizable by the CPU 42.

For example, the CPU 42 transmits the offset time "2 seconds" recorded so as to be associated with Group 1 and the measuring period "30 minutes," the offset time "2 seconds" recorded so as to be associated with Group 1 and the measuring period "1 hour," and the offset time "2 seconds" recorded so as to be associated with Group 1 and the measuring period "3 hours," to the terminal devices 3*a*-3*e* according to Group 1, respectively.

For example, the CPU 42 transmits the offset time "6 seconds" recorded so as to be associated with Group 2 and the measuring period "30 minutes," the offset time "5.5 seconds" recorded so as to be associated with Group 2 and the measuring period "1 hour," and the offset time "3.5 seconds" recorded so as to be associated with Group 2 and the measuring period "3 hours," to the terminal devices 3*f* and 3*g* according to Group 2, respectively.

For example, the CPU 42 transmits the offset time "7.5 seconds" recorded so as to be associated with Group 3 and the measuring period "30 minutes," the offset time "7 seconds" recorded so as to be associated with Group 3 and the measuring period "1 hour," and the offset time "3.5 seconds" recorded so as to be associated with Group 3 and the measuring period "3 hours," to the terminal devices 3*h*-3*j* according to Group 3, respectively.

When the offset time is received from the terminal controlling device 2, the CPU 52 of each terminal device 3 records the received offset time as the offset time data 563 of the EEPROM 56 (Step S407). FIGS. 16A, 16B and 16C are views illustrating examples of the measuring period data and the offset time data which are recorded on the EEPROM 56 of the terminal device 3 belonging to each of Groups 1-3.

For example, each CPU 52 of the terminal devices 3*a*-3*e* belonging to Group 1 records "30 minutes," "1 hour" and "3 hours" as the measuring period data 562*d* of the corresponding terminal device, and records the offset time "2 seconds" associated with the measuring period "30 minutes," the offset time "2 seconds" associated with the measuring period "1 hour," and the offset time "2 seconds" associated with the measuring period "3 hours," as the offset time data 563*d*, respectively.

For example, each CPU 52 of the terminal devices 3*f* and 3*g* belonging to Group 2 records "30 minutes," "1 hour" and "3 hours" as the measuring period data 562*d* of the corresponding terminal device, and records the offset time "6 seconds" associated with the measuring period "30 minutes," the offset time "5.5 seconds" associated with the measuring period "1 hour," and the offset time "3.5 seconds" associated with the measuring period "3 hours," as the offset time data 563*d*, respectively.

For example, each CPU 52 of the terminal devices 3*h*-3*j* belonging to Group 3 records "30 minutes," "1 hour" and "3 hours" as the measuring period data 562*d* of the corresponding terminal device, and records the offset time "7.5 seconds" associated with the measuring period "30 minutes," the offset time "7 seconds" associated with the measuring period "1 hour," and the offset time "3.5 seconds" associated with the measuring period "3 hours," as the offset time data 563*d*, respectively.

Figure 17:
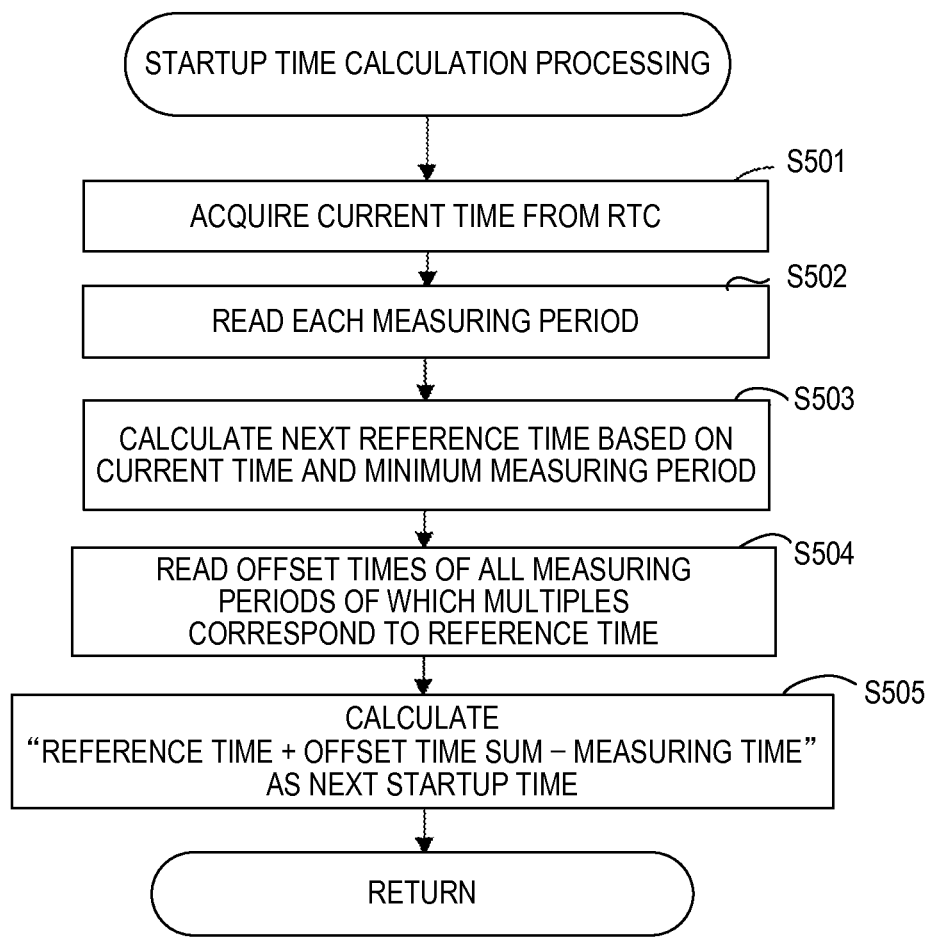
FIG. 17 is a view illustrating one example of a flowchart of the subroutine of the startup time calculation processing in the terminal device 3.

The CPU 52 performs the startup time calculation processing by a subroutine (Step S108). FIG. 17 is a view illustrating one example of a flowchart of the subroutine of the startup time calculation processing in the terminal device 3.

The CPU 52 acquires the current time from the RTC (Step S501). The CPU 52 reads each measuring period (Step S502). For example, the CPU 52 reads the measuring periods "30 minutes," "1 hour" and "3 hours" from the measuring period data 562*d* illustrated in FIG. 16A.

The CPU 52 calculates a next reference time based on the current time and each measuring period (Step S503). For example, when reckoning from the initial time, the CPU 52 determines as the next reference time, a future time closest to the current time among times corresponding to multiples of the minimum measuring period recorded as the measuring period data 562.

For example, the CPU 52 reckons from the initial time "00:00:00," and adopts "06:00:00" which is a time corresponding to multiples of the minimum measuring period "30 minutes," and is a future time closest to the current time "05:50:00," as the next reference time.

The CPU 52 reads all the offset times of the measuring periods of which the multiples correspond to the calculated reference time (Step S504). For example, since the measuring periods of which the multiples correspond to the reference time "06:00:00" are "30 minutes," "1 hour" and "3 hours," the CPUs 52 of the terminal devices 3*a*-3*e* belonging to Group 1 reads the offset time "2 seconds" corresponding to the measuring period "30 minutes," the offset time "2 seconds" corresponding to the measuring period "1 hour," and the offset time "2 seconds" corresponding to the measuring period "3 hours" from the offset time data 563*d* illustrated in FIG. 16A.

Note that, for example, if the reference time is "05:00:00," since the measuring periods of which the multiples correspond to the reference time are "30 minutes" and "1 hour," the CPU 52 reads the offset time "2 seconds" corresponding to the measuring period "30 minutes" and the offset time "2 seconds" corresponding to the measuring period "1 hour."

The CPU 52 calculates the time at which the terminal device 3 is to be started for next time (the next startup time) based on the reference time, the sum of offset times, and the measuring time (Step S505). Here, as for the measuring time, "2 seconds" is set, similar to the first embodiment.

For example, each CPU 52 of the terminal devices 3*a*-3*e* belonging to Group 1 adds "6 seconds" which is a sum of the offset time "2 seconds" corresponding to the measuring period "30 minutes," the offset time "2 seconds" corresponding to the measuring period "1 hour," and the offset time "2 seconds" corresponding to the measuring period "3 hours" as illustrated in FIG. 16A to the reference time Tnxt "06:00:00," and then subtracts the measuring time "2 seconds" of the measuring sensor 54 described above to calculate "06:00:04" as the next startup time of itself.

Similarly, for example, each CPU 52 of the terminal devices 3*f* and 3*g* belonging to Group 2 adds "15 seconds" which is a sum of the offset time "6 seconds" corresponding to the measuring period "30 minutes," the offset time "5.5 seconds" corresponding to the measuring period "1 hour," and the offset time "3.5 seconds" corresponding to the measuring period "3 hours" as illustrated in FIG. 16B to the reference time Tnxt "06:00:00," and then subtracts the measuring time "2 seconds" of the measuring sensor 54 described above to calculate "06:00:13" as the next startup time of itself.

Similarly, for example, each CPU 52 of the terminal devices 3*h*-3*j* belonging to Group 3 adds "18 seconds" which is a sum of the offset time "7.5 seconds" corresponding to the measuring period "30 minutes," the offset time "7 seconds" corresponding to the measuring period "1 hour," and the offset time "3.5 seconds" corresponding to the measuring period "3 hours" as illustrated in FIG. 16C to the reference time Tnxt "06:00:00," and then subtracts the measuring time "2 seconds" of the measuring sensor 54 described above to calculate "06:00:16" as the next startup time of itself.

Figure 18:
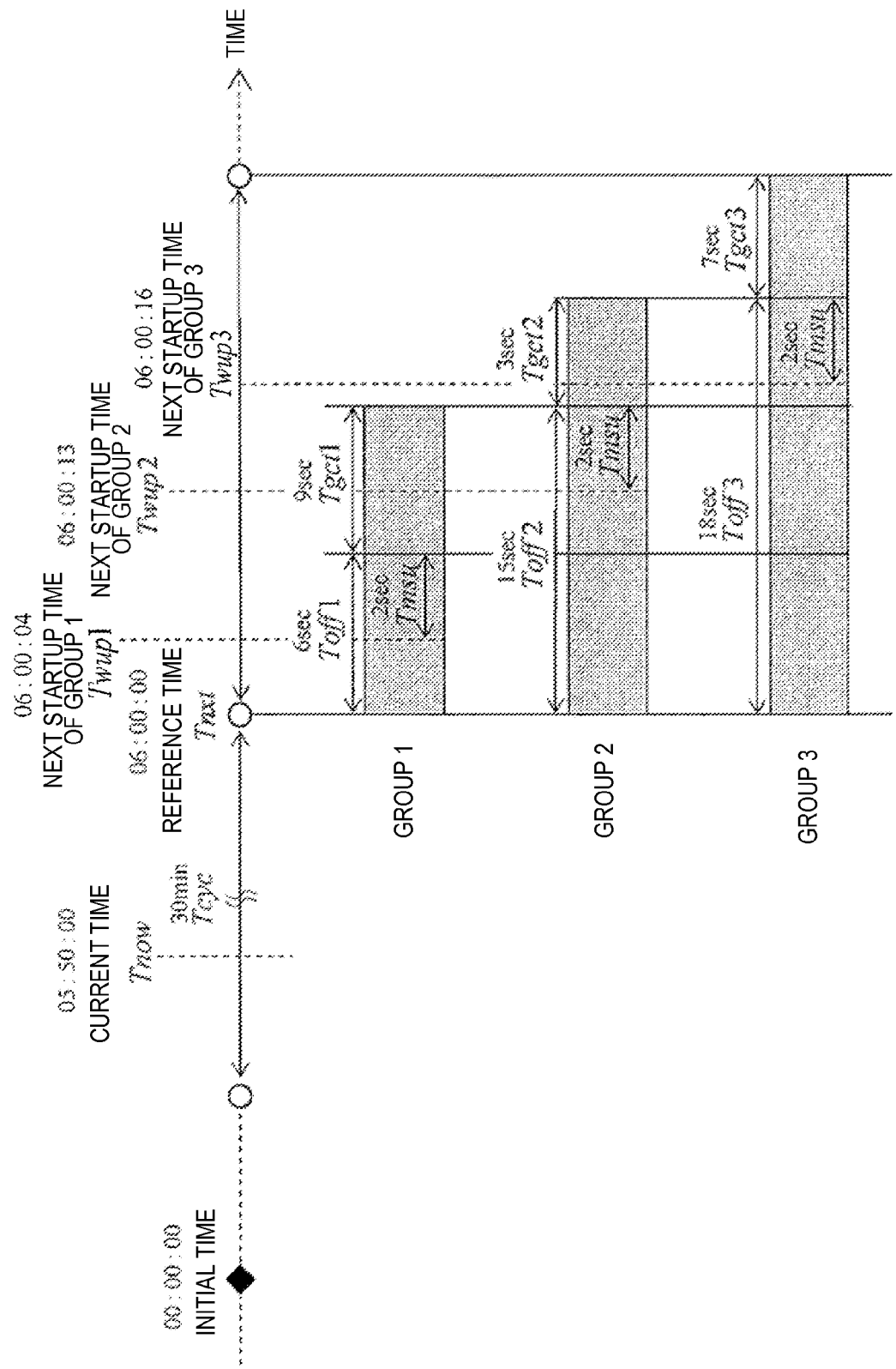
FIG. 18 is a view schematically illustrating one example of processing when calculating the startup time of the terminal device 3.

FIG. 18 is a view schematically illustrating one example of processing when calculating the startup time of the terminal device 3. As illustrated in FIG. 18, offset times Toff1 (6 seconds), Toff2 (15 seconds), and Toff3 (18 seconds) recorded corresponding to each group are set, respectively.

Further, as illustrated in FIG. 18, "06:00:04" is set as the next startup time of the terminal devices 3*a*-3*e* belonging to Group 1, "06:00:13" is set as the next startup time of the terminal devices 3*f* and 3*g* belonging to Group 2, and "06:00:16" is set as the next startup time of the terminal devices 3*h*-3*j* belonging to Group 3.

After the subroutine of FIG. 17 is finished, the CPU 52 returns to Step S409 of FIG. 14 to set the calculated next startup time to the RTC. For example, each CPU 52 of the terminal devices 3*a*-3*e* belonging to Group 1 sets the next startup time "06:00:04" as the startup time data 511 of the RTC 51.

Similarly, each CPU 52 of the terminal devices 3*f* and 3*g* belonging to Group 2 sets the next startup time "06:00:13" as the startup time data 511 of the RTC 51. Further, each CPU 52 of the terminal devices 3*h*-3*j* belonging to Group 3 sets the next startup time "06:00:16" as the startup time data 511 of the RTC 51.

After the next startup time is set to the RTC 51, the CPU 52 turns off the power of the terminal device 3 to be in the sleeping state. Note that the measurement processing in the second embodiment corresponds to the processing described using FIG. 10 in the first embodiment.

3. Others

In the embodiments described above, the number of hops according to the number of repeater devices 4 via which the terminal controlling device 2 and the terminal device 3 communicate with each other is used. However, if the terminal controlling device 2 and the terminal device 3 directly communicate with each other, without the repeater device 4 intervening, the number of hops may be "1." Note that, in such a case, the present invention may also be applied by defining a single terminal device 3 which directly communicates with the terminal controlling device 2 as one group.

In the embodiments described above, the example in which the terminal device 3 is controlled is illustrated. However, a similar function to the terminal device 3 may be incorporated into the repeater device 4, and the wake-up and sleeping processings may be performed for the terminal device 3 as well as the repeater device 4 which is located at a high order hierarchy from the terminal device 3 so that the repeater device 4 is synchronized with the terminal device 3 located at a lower order hierarchy.

Two or more of parts or all of the configurations described in the above embodiments may be combined.

DESCRIPTION OF REFERENCE NUMERALS

21 Communication Time Calculator
22 Offset Time Calculator
23 Offset Time Manager
24 Measuring Period Manager
25 Measurement Data Memory
31 Offset Time Memory
32 Startup Time Calculator
33 Measuring Period Memory
34 Startup Controller
35 Measuring Part

The invention claimed is:

1. A terminal control system comprising a plurality of terminal devices and a control device for controlling the plurality of terminal devices, wherein,
a terminal device is configured to:
start up at a predetermined startup time, after a reference time that is a reference when the plurality of terminal devices perform predetermined terminal processings during the same period,
complete a preparation for transmission of data as a terminal processing, after the predetermined startup time and before a predetermined offset time from the reference time is lapsed, and
perform processing for transmitting predetermined data to the control device, after the predetermined offset time is lapsed and within a predetermined communication time, and the control device is configured to:
calculate an offset time for another terminal device for performing the terminal processing subsequently to the terminal device, based on a communication time, and
the other terminal device is configured to:
set a startup time determined based on the calculated offset time as a next startup time, wherein:
the calculated offset time includes a measuring time for measuring an object, and
the startup time is a time that is obtained by adding the calculated offset time to the reference time and subtracting the measuring time.

2. The terminal control system of claim 1, wherein,
each of the terminal devices belongs to any one of a plurality of groups,
the communication time is an entire communication time of the group to which the terminal devices belong, and
the control device is configured to:
calculate offset times for the terminal devices belonging to another group that performs the terminal processings subsequently to the terminal devices belonging to the previous group, based on the communication time.

3. The terminal control system of claim 1, wherein,
the control device is configured to:
when, among the plurality of terminal devices, a first period terminal device for performing the terminal processing at every first period, and a second period terminal device for performing the terminal processing at every second period exist,
calculate a first period offset time for another first period terminal device for performing the terminal processing subsequently to the first period terminal device, based on the communication time of the first period terminal device,
calculate a second period offset time for another second period terminal device for performing the terminal processing subsequently to the second period terminal device, based on the communication time of the second period terminal device, and
adopt a sum of the first period offset time and the second period offset time, as an offset time for the other terminal device.

4. The terminal control system of claim 1, wherein,
the terminal processing includes processing for transmitting measurement data obtained by measuring an object, from the terminal device to the control device.

5. A method comprising:
(a) a terminal device starting up at a predetermined startup time, after a reference time that is a reference when a plurality of terminal devices perform predetermined terminal processings during the same period;
(b) the terminal device completing preparation for transmission of data as the terminal processing, after the predetermined startup time and before a predetermined offset time from the reference time is lapsed;
(c) the terminal device performing processing for transmitting predetermined data to a control device, after the predetermined offset time is lapsed and within a predetermined communication time;
(d) a control device calculating an offset time for another terminal device for performing the terminal processing subsequently to the terminal device, based on the communication time; and (e) the other terminal device setting a startup time determined based on the calculated offset time as a next startup time, wherein:
  the calculated offset time includes a measuring time for measuring an object, and
  the startup time is a time that is obtained by adding the calculated offset time to the reference time and subtracting the measuring time.

* * * * *